United States Patent
Wodrich et al.

(10) Patent No.: US 10,852,418 B2
(45) Date of Patent: Dec. 1, 2020

(54) VEHICLE SENSOR WITH INTEGRATED RADAR AND IMAGE SENSORS

(71) Applicant: MAGNA ELECTRONICS INC., Auburn Hills, MI (US)

(72) Inventors: Helmut A. Wodrich, Clarkston, MI (US); Walter G. Woodington, Lincoln, MA (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 440 days.

(21) Appl. No.: 15/685,123

(22) Filed: Aug. 24, 2017

(65) Prior Publication Data
US 2018/0059236 A1 Mar. 1, 2018

Related U.S. Application Data

(60) Provisional application No. 62/398,094, filed on Sep. 22, 2016, provisional application No. 62/378,849, filed on Aug. 24, 2016.

(51) Int. Cl.
*G01S 13/86* (2006.01)
*G01S 13/931* (2020.01)
*B60T 7/22* (2006.01)

(52) U.S. Cl.
CPC .............. *G01S 13/867* (2013.01); *B60T 7/22* (2013.01); *G01S 13/931* (2013.01);
(Continued)

(58) Field of Classification Search
CPC ................ G01S 13/867; G01S 13/931; G01S 2013/93272; G01S 2013/93185;
(Continued)

(56) References Cited

U.S. PATENT DOCUMENTS 3,778,823 A * 12/1973 Sato .................. B60R 21/013
342/72
5,949,331 A 9/1999 Schofield et al.
(Continued)

FOREIGN PATENT DOCUMENTS

| DE | 102007039834 | * | 2/2009 |
|---|---|---|---|
| WO | 2011090484 A1 | | 7/2011 |
| WO | 2018007995 A1 | | 1/2018 |

OTHER PUBLICATIONS

Nissan North America, Inc.; "2012 Pathfinder Owner's Manual", 2011 (Year: 2011).*
(Continued)

*Primary Examiner* — Frank J McGue
(74) *Attorney, Agent, or Firm* — Honigman LLP (57) ABSTRACT

A sensing system of a vehicle includes a sensor module disposed at the vehicle. The sensor module includes first and second radar sensors and a camera. A field of sensing of the first radar sensor is encompassed by a portion of a field of view of the camera and a field of sensing of the second radar sensor is encompassed by another portion of the field of view of the camera. Outputs of the radar sensors and the camera are communicated to a control. The control, responsive to processing of the outputs of the radar sensors, detects the presence of an object exterior the vehicle and within the field of sensing of at least one of the radar sensors. The control, responsive to detection of an object via processing of the outputs of the radar sensors, processes the output of the camera to classify the detected object.

18 Claims, 6 Drawing Sheets

(52) U.S. Cl.
CPC ............... *B60T 2201/022* (2013.01); *G01S 2013/9314* (2013.01); *G01S 2013/9315* (2020.01); *G01S 2013/93185* (2020.01); *G01S 2013/93272* (2020.01)

(58) Field of Classification Search
CPC ..... G01S 2013/9315; G01S 2013/9314; G01S 2013/9378; G01S 2013/9346; G01S 2013/9332; B60T 7/22; B60T 2201/022; B60T 2201/10; B60T 8/171
USPC .......................................................... 342/55
See application file for complete search history.

(56) References Cited

U.S. PATENT DOCUMENTS

| | | | |
|---|---|---|---|
| 6,587,186 B2 | 7/2003 | Bamji et al. | |
| 6,674,895 B2 | 1/2004 | Rafii et al. | |
| 6,678,039 B2 | 1/2004 | Charbon | |
| 6,690,268 B2 | 2/2004 | Schofield et al. | |
| 6,690,354 B2 | 2/2004 | Sze | |
| 6,693,517 B2 | 2/2004 | McCarthy et al. | |
| 6,710,770 B2 | 3/2004 | Tomasi et al. | |
| 6,825,455 B1 | 11/2004 | Schwarte | |
| 6,876,775 B2 | 4/2005 | Torunoglu | |
| 6,906,793 B2 | 6/2005 | Bamji et al. | |
| 6,919,549 B2 | 7/2005 | Bamji et al. | |
| 7,053,357 B2 | 5/2006 | Schwarte | |
| 7,157,685 B2 | 1/2007 | Bamji et al. | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,580,795 B2 | 8/2009 | McCarthy et al. | |
| 8,013,780 B2 | 9/2011 | Lynam | |
| 8,027,029 B2 | 9/2011 | Lu et al. | |
| 8,698,894 B2 | 4/2014 | Briggance | |
| 8,855,849 B1* | 10/2014 | Ferguson ................. G05D 1/00 701/28 |
| 9,036,026 B2 | 5/2015 | Dellantoni et al. | |
| 9,146,898 B2 | 9/2015 | Ihlenburg et al. | |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,753,121 B1 | 9/2017 | Davis et al. | |
| 2005/0267683 A1* | 12/2005 | Fujiwara ............. B60T 8/17558 701/301 |
| 2008/0169963 A1* | 7/2008 | White ...................... G01S 13/89 342/52 |
| 2010/0001897 A1 | 1/2010 | Lyman | |
| 2010/0245066 A1 | 9/2010 | Sarioglu et al. | |
| 2012/0062743 A1 | 3/2012 | Lynam et al. | |
| 2012/0218412 A1 | 8/2012 | Dellantoni et al. | |
| 2013/0063257 A1* | 3/2013 | Schwindt ............. B60W 30/095 340/425.5 |
| 2013/0215271 A1 | 8/2013 | Lu | |
| 2013/0222592 A1 | 8/2013 | Gieseke | |
| 2013/0241766 A1* | 9/2013 | Kishigami ............... G01S 7/023 342/159 |
| 2014/0062762 A1* | 3/2014 | Kurono ................... G01S 7/354 342/146 |
| 2014/0218529 A1 | 8/2014 | Mahmoud et al. | |
| 2014/0375476 A1 | 12/2014 | Johnson et al. | |
| 2015/0124096 A1 | 5/2015 | Koravadi | |
| 2015/0158499 A1 | 6/2015 | Koravadi | |
| 2015/0251599 A1 | 9/2015 | Koravadi | |
| 2015/0352953 A1 | 12/2015 | Koravadi | |
| 2016/0036917 A1 | 2/2016 | Koravadi et al. | |
| 2016/0116573 A1* | 4/2016 | Appia ....................... G01S 7/40 342/52 |
| 2016/0210853 A1 | 7/2016 | Koravadi | |
| 2016/0291146 A1* | 10/2016 | Wang ........................ G01S 7/03 |
| 2017/0129489 A1 | 5/2017 | Pawlicki et al. | |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0315231 A1 | 11/2017 | Wodrich | |
| 2017/0328997 A1* | 11/2017 | Silverstein ................. G01S 7/41 |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0065623 A1 | 3/2018 | Wodrich et al. | |
| 2018/0067194 A1 | 3/2018 | Wodrich et al. | |
| 2018/0105176 A1 | 4/2018 | Pawlicki et al. | |
| 2018/0231635 A1 | 8/2018 | Woehlte | |
| 2018/0231657 A1 | 8/2018 | Woehlte | |
| 2018/0299533 A1 | 10/2018 | Pliefke et al. | |
| 2019/0061760 A1 | 2/2019 | Pawlicki et al. | |
| 2019/0072666 A1 | 3/2019 | Duque Biarge et al. | |
| 2019/0072667 A1 | 3/2019 | Duque Biarge et al. | |
| 2019/0072668 A1 | 3/2019 | Duque Biarge et al. | |
| 2019/0072669 A1 | 3/2019 | Duque Biarge et al. | |
| 2019/0217775 A1 | 7/2019 | May et al. | |

OTHER PUBLICATIONS

Machine translation of specificaiton of DE101007039834 (Year: 2009).*

Machine translation of claims of DE102007039834 (Year: 2009).*

* cited by examiner

Pitch Boresight of Radar Sensor

Roll Boresight of Radar Sensor

Integrated Camera & Radar package
(90° opposed antenna)

Radar Sensor #1
Vertical Resolution
Orientation

Camera Body

Radar Sensor #1
Horizontal Resolution
Orientation

Integrated Camera + 3D Radar
Symmetric Radar Cube Package

VEHICLE SENSOR WITH INTEGRATED RADAR AND IMAGE SENSORS

CROSS REFERENCE TO RELATED APPLICATIONS

The present application claims the filing benefits of U.S. provisional applications, Ser. No. 62/398,094, filed Sep. 22, 2016, and Ser. No. 62/378,849, filed Aug. 24, 2016, which are hereby incorporated herein by reference in their entireties.

FIELD OF THE INVENTION

The present invention relates generally to a vehicle sensing system for a vehicle and, more particularly, to a vehicle sensing system that utilizes one or more sensors at a vehicle to provide a field of sensing at or around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

SUMMARY OF THE INVENTION

The present invention provides a driver assistance system or sensing system for a vehicle that utilizes a sensor module disposed at the vehicle to sense a respective region exterior of the vehicle, with the sensor module comprising one or more radar sensors and at least one camera disposed in a common housing. A field of sensing of the radar sensor(s) is encompassed by a portion of a field of view of the at least one camera. The system includes a control, where outputs of the radar sensor(s) and the at least one camera are communicated to the control, and where the control, responsive to processing of the outputs of the radar sensor(s), detects the presence of one or more objects exterior the vehicle and within the field of sensing of at least one of at least one radar sensor, and where the control, responsive to processing of the output of the at least one camera, classifies the detected object.

According to an aspect of the present invention, a sensing system of a vehicle includes a sensor module disposed at a vehicle. The sensor module includes first and second radar sensors and a camera. A field of sensing of the first radar sensor is encompassed by a portion of a field of view of the camera and a field of sensing of the second radar sensor is encompassed by another portion of the field of view of the camera. Outputs of the radar sensors and the camera are communicated to a control. The control, responsive to processing of the outputs of the radar sensors, detects the presence of an object exterior the vehicle and within the field of sensing of at least one of the radar sensors. The control, responsive to detection of an object via processing of the outputs of the radar sensors, processes the output of the camera to classify the detected object.

The sensor module may comprise a circuit board with the first and second radar sensors and the camera disposed at the circuit board, and with the camera disposed at the circuit board at a location between the first and second radar sensors. Physical orientation of the second radar sensor at the circuit board relative to the camera may be different from physical orientation of the first radar sensor at the circuit board relative to the camera. For example, one may be oriented for horizontal resolution and one may be oriented for vertical resolution (where they are oriented with their antenna arrays rotated about 90 degrees relative to one another).

The sensor module may be disposed at a rear of the vehicle such that the camera views rearward of the vehicle. During a reversing maneuver of the vehicle, a display device of the vehicle may display video images derived from the output of the camera.

These and other objects, advantages, purposes and features of the present invention will become apparent upon review of the following specification in conjunction with the drawings.

DESCRIPTION OF THE PREFERRED EMBODIMENTS

A vehicle sensing system, such as a driver or driving assist system, object detection system, parking assist system and/or alert system, operates to capture sensing data exterior of the vehicle and may process the captured data to detect objects at or near the vehicle and in the predicted path of the vehicle, such as to assist a driver of the vehicle in maneuvering the vehicle in a forward or rearward direction or to assist the driver in parking the vehicle in a parking space. The system includes a processor that is operable to receive sensing data from multiple sensors and to provide an output to a control that, responsive to the output, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle).

Figure 1:
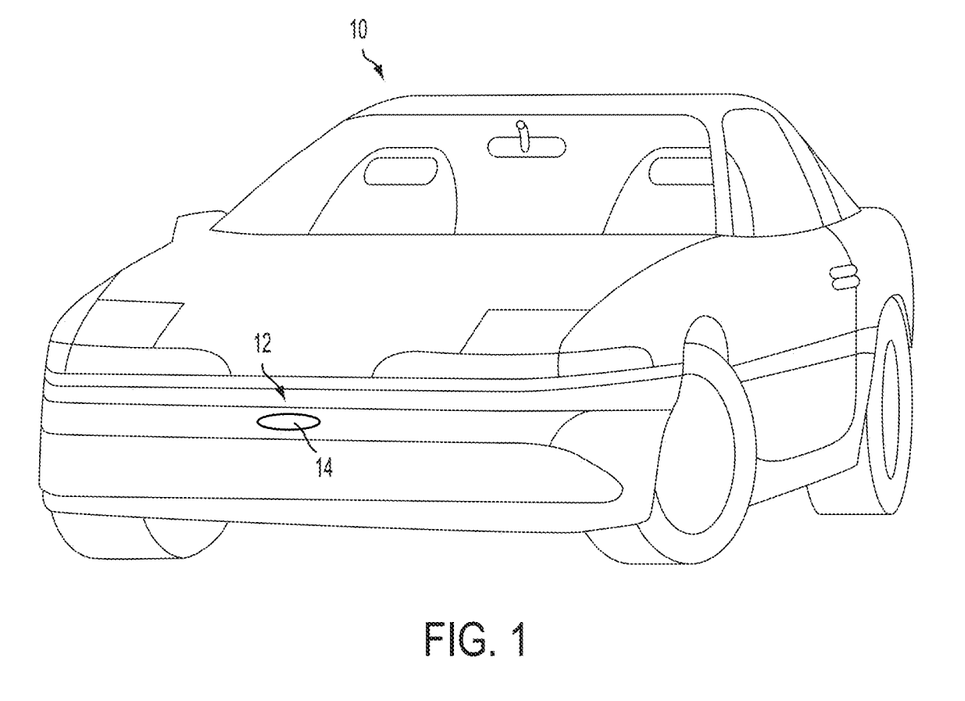
FIG. 1 is a perspective view of a vehicle with a sensing system that incorporates a radar sensor in accordance with the present invention.

Referring now to the drawings and the illustrative embodiments depicted therein, a vehicle 10 includes an driver assistance system or sensing system 12 that includes at least one radar sensor unit, such as a forward facing radar sensor unit 14 (and the system may optionally include multiple exterior facing sensors, such as cameras or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle.

Some automotive radars use MIMO (Multiple Input Multiple Output) techniques to create an effective virtual antenna aperture, which is significantly larger than the real antenna aperture, and delivers much better angular resolution than conventional radars, such as, for example, conventional scanning radars. MIMO techniques may be used to create virtual antenna apertures, not only from linear arrays of real antennas but also from two dimensional arrays of real antennas. For example, the antenna array of a MIMO sensor may comprise two transmitting antennas and two or more receiving antennas, arranged either in a one-dimensional array or as in a two-dimensional array. Thus, the antenna array may consist of four antennas (arranged as a 2×2 array MIMO virtual antenna) or any other combination of transmitting and receiving antennas, whose product is the number of virtual antennas, such as, for example, 16 virtual antennas (4×4 array) or more or less than 16 virtual antennas.

For vision systems having an exterior viewing camera, the challenge is that the OEM system level requirements may specify that objects need to be detected and classified between 0 m . . . 18 m with a resolution in the 10 cm range. In order to 'see' enough of the object in the close range (0 . . . 2 m), a camera lens with about a 185 degree opening angle is needed producing a fisheye image. The large opening angle of the lens in combination with an imager with limited resolution (such as around 1 MP, which are spread in an angle to cover the desired wide field of view) causes a very poor resolution in the long range. For example, at 10 m range the pixel resolution is around 1.2 m, meaning that distance measurement with enough precision beyond 10 m is difficult to nearly impossible.

For a radar sensing system with a 16 virtual receiver configuration, the angular resolution is approximately 10 degrees. The spot size of a slice of the radar's field of view would be approximated by the equation (angular resolution× range)/57. Thus, at one meter, the spot slice is about 17 cm. As the range is extended, the spot size would increase.

If a radar sensor with horizontal slices and another radar sensor with vertical slices are utilized to cover an FOV, the intersection of their slices one from each sensor permits a 17 square cm spot in 2-D for fine resolution over the common FOV. The BSD (blind spot detection) corner sensors would allow for conversion of the spot to a cube for three dimensional (3D) and terrain monitoring.

Figure 2:
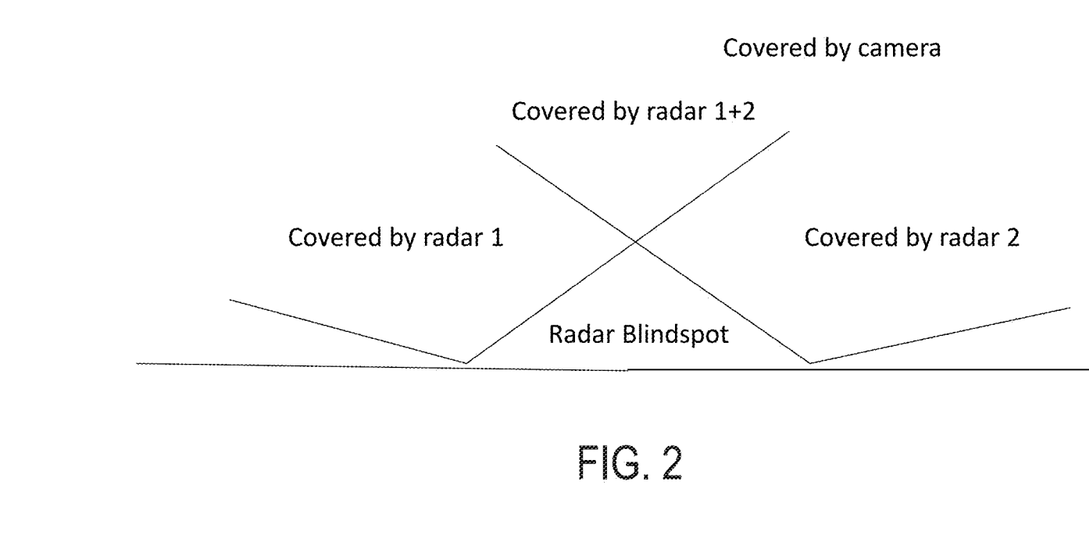
FIG. 2 is a schematic showing the regions encompassed by the fields of sensing of a pair of radar sensors and a camera.

Corner radar sensors may be used for detection and cameras may be used for classification. For example, the radar sensors mounted at the corners of the vehicle are used for the object detection and the rearward viewing camera may be used for classification (and optionally for display of video images derived from and representative of image data captured by the rearward viewing camera). The radar sensors can be used for measurement of object height and object location. A higher accuracy is achieved in the FOV where the radar sensors overlap. However, a radar blindspot may occur at the center area of the vehicle (see FIG. 2).

Figure 3:
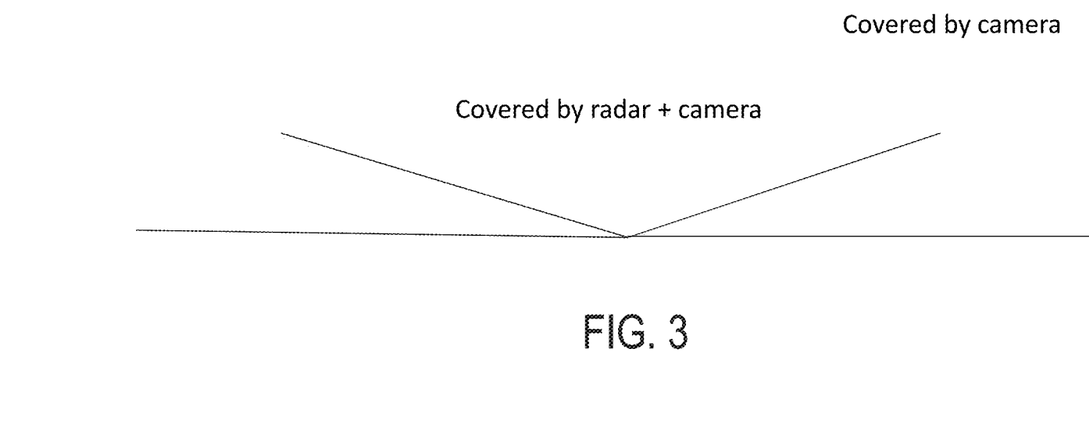
FIG. 3 is a schematic showing the regions encompassed by the fields of sensing of a radar and a camera disposed in a common housing in accordance with the present invention.

The present invention provides an integrated radar sensor and camera that are integrated into the same or common housing (see FIG. 3). The radar sensor is used for object detection and object localization, with a vertical opening angle of about 150 degrees, a range of about 30 m, and range resolution of about 7.5 cm. The radar sensor allows for measuring of the height of objects, the relative velocity and path. The camera and machine vision/image processing is used for object classification (such as, for example, pedestrians, vehicles, bicycles, and/or the like).

For example, the radar and camera data may be fused for an automatic emergency braking (AEB) system of the vehicle. The machine vision/image processing of the camera does not require object detection anymore, therefore is of less risk for smart camera implementations (less processing performance required). If the camera and radar are packaged together, there is less integration effort for the OEM, also wiring is minimized.

Figure 4:
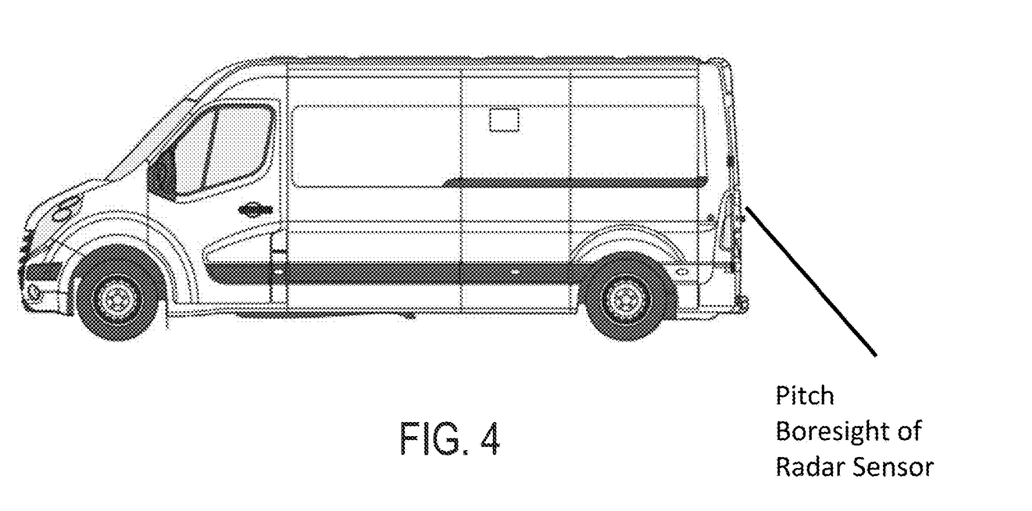
FIG. 4 is a side elevation of a vehicle equipped with a sensing system of the present invention, showing the pitch boresight of the radar sensor.
Figure 5:
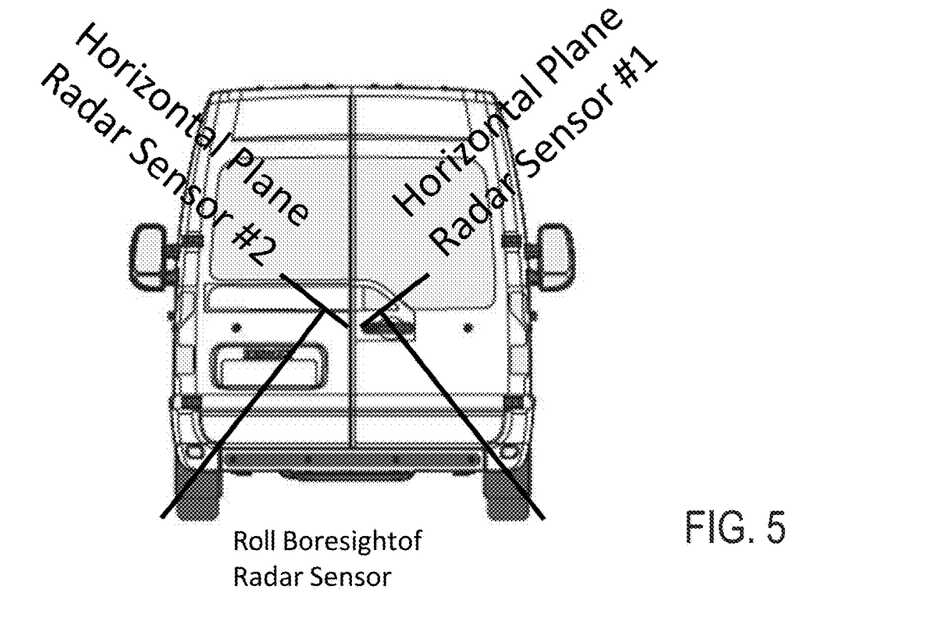
FIG. 5 is a rear elevation of the vehicle equipped with the sensing system, showing the roll boresight of the radar sensor.
Figure 6:
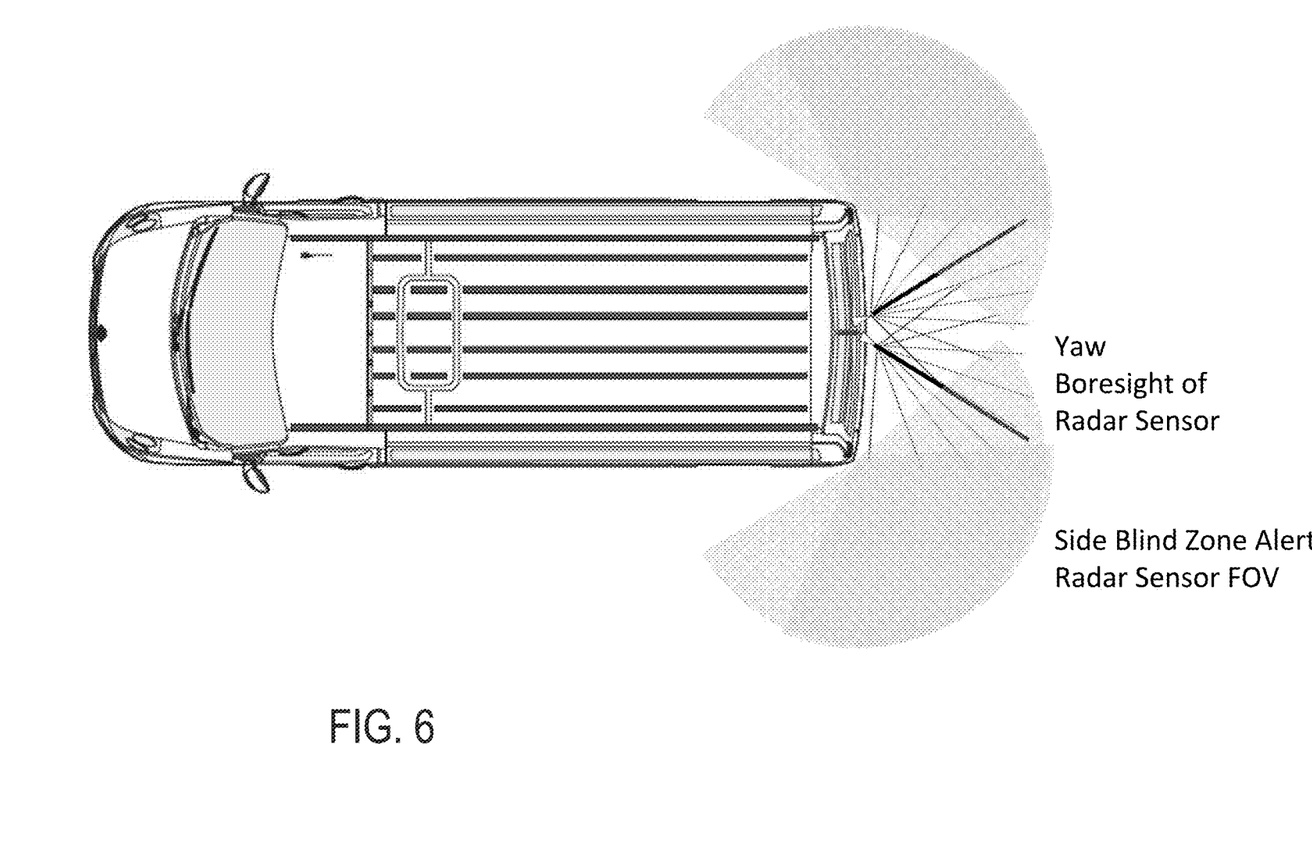
FIG. 6 is a top plan view of the vehicle equipped with the sensing system, showing the yaw boresight of the radar sensor.

Optionally, the system may integrate radar sensor(s) in stereo three dimensional (3D) configuration and a camera into a common housing. The radar sensors are positioned such that their horizontal and vertical azimuths are intersecting. It is envisioned that the radar sensors have common horizontal and vertical fields of view or fields of sensing and common azimuth resolution. Each radar sensor is used for object detection and object localization, with a vertical opening angle of about 150 degrees, a range of about 30+m, and a range resolution of 7.5 cm. The radar sensor allows measuring of the height of objects and creation of a terrain map. The pitch of the radar sensor mounting (see FIG. 4) is selected to maximize the coverage close to the vehicle, with the vertical field of view/sensing ideally intersecting the vehicle. The roll (FIG. 5) and yaw (FIG. 6) of the radar sensors is selected to balance depth measurement across the entire combined field of sensing of all of the radar sensors.

It is envisioned that the sensors' horizontal planes are rotated greater than about 90 degrees relative to each other, providing intersecting beams in range, velocity, azimuth and elevation for all detections, creating radar data cubes of known size for all volumes in 3D space within the combined field of view of at least three sensors on the vehicle. Camera, radar and machine vision/image processing is used for object classification (such as, for example, pedestrians, vehicles, bicycles, and/or the like). The captured radar data and camera/image data is fused for automatic emergency braking (AEB) applications.

Optionally, the radar sensors may operate collaboratively, where the transmitted signals from each transmit antenna of radar sensor #1 are received and processed by all receive antenna of both radar sensor #1 and radar sensor #2, thereby increasing effective aperture, accuracy and resolution of the system.

The machine vision/image processing of the camera-captured image data does not require object detection, and thus is of less risk for smart camera implementations (less processing performance required). If the camera and radar are packaged together, there is less integration effort for the OEM, while also minimizing or reducing wiring requirements.

Figure 7:
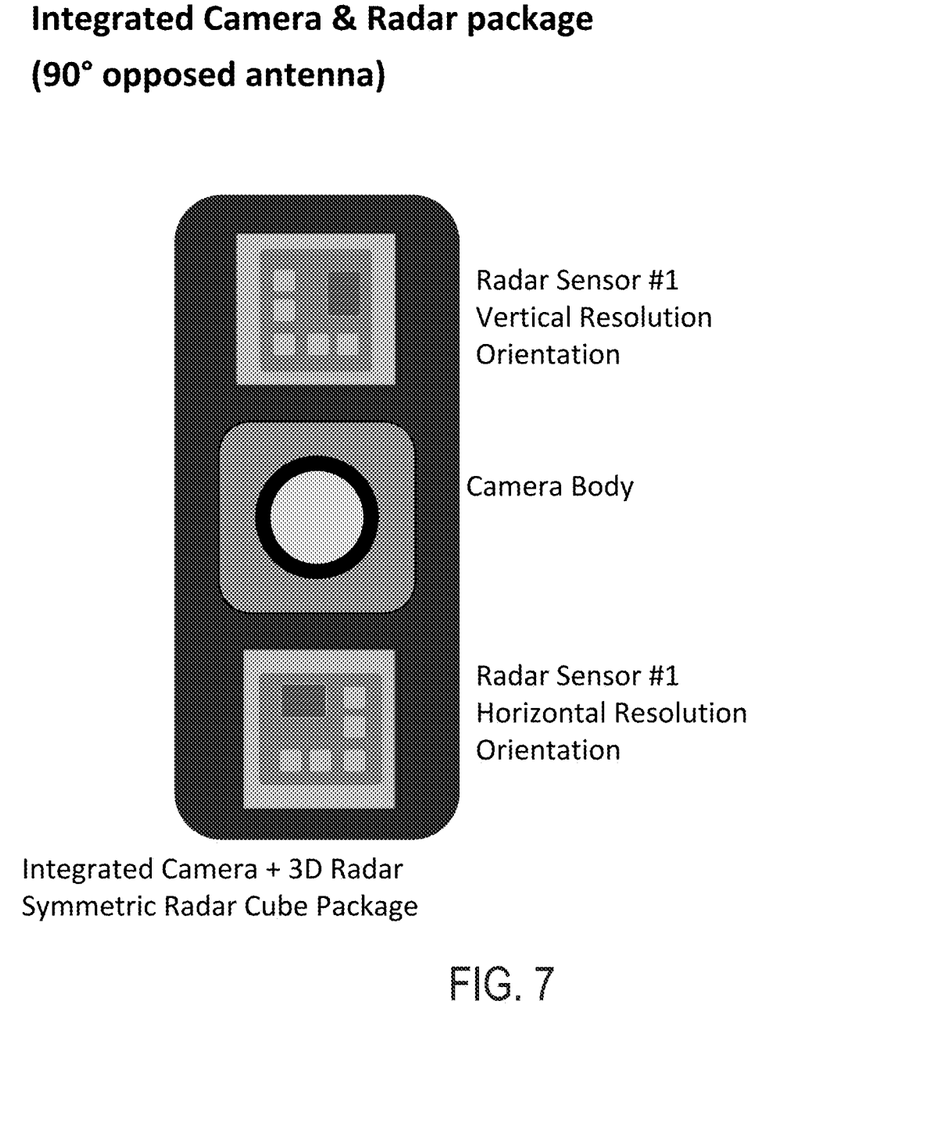
FIG. 7 is a schematic of an integrated camera and radar device, showing the radar sensors at 90 degrees relative to one another.
Figure 8:
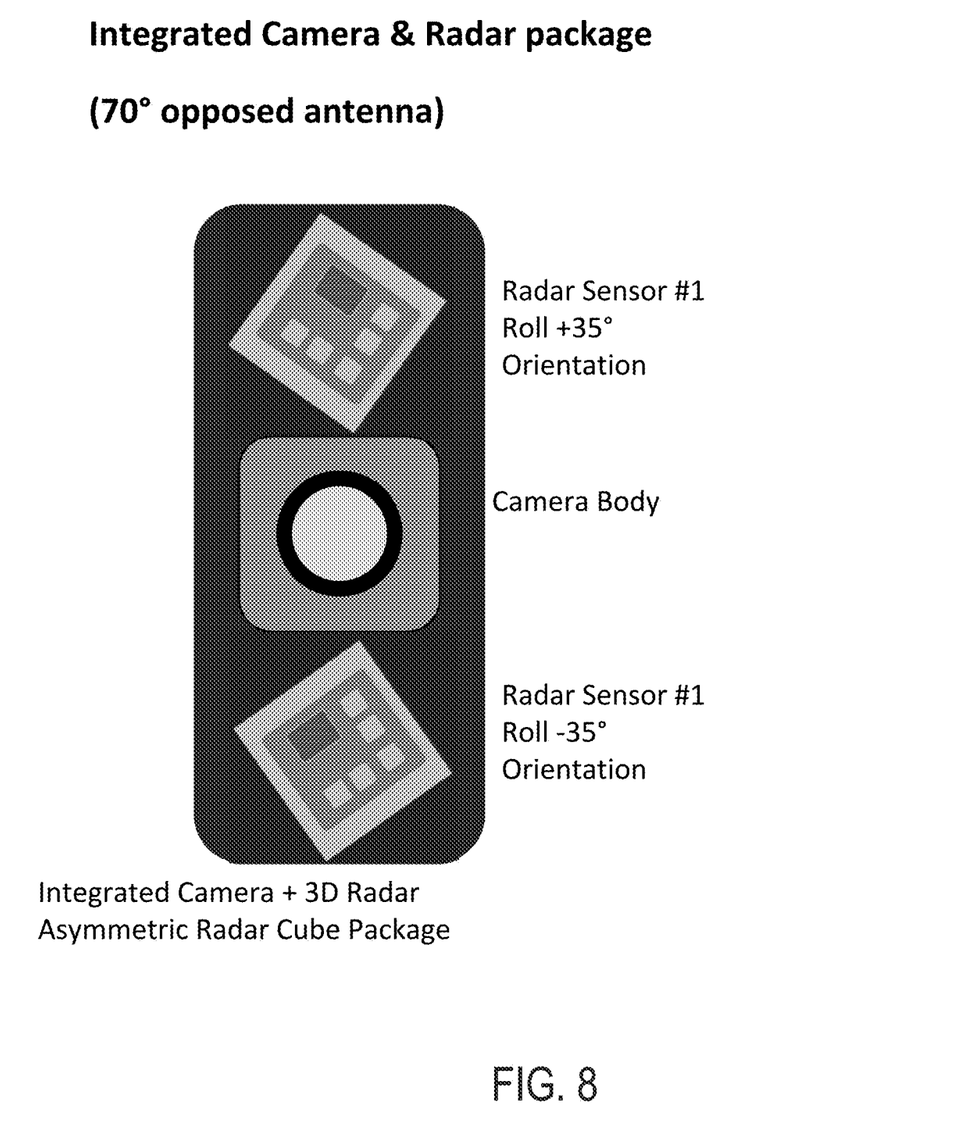
FIG. 8 is a schematic of an integrated camera and radar device, showing the radar sensors at 70 degrees relative to one another.

As shown in FIGS. 7 and 8, an integrated camera and radar package may include a camera disposed between two radar sensors. Optionally, the radar sensors may be arranged at 90 degrees relative to one another (FIG. 7), such that (when the device is mounted at a vehicle) one radar sensor antenna is at a vertical resolution orientation and the other radar sensor antenna is at a horizontal resolution orientation, thus providing a symmetric radar cube package. Optionally, the radar sensors may be arranged at a different angle (such as, for example, 70 degrees in FIG. 8) relative to one another, such that (when the device is mounted at a vehicle) one radar sensor antenna is at a roll+35 degree orientation and the other radar sensor antenna is at a roll−35 degree orientation, thus providing an asymmetric radar cube package. Clearly, other orientations may be implemented depending on the particular application of the integrated radar and camera sensing device and system.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication Nos. US-2017-0222311 and/or US-2010-0245066, and/or U.S. patent application Ser. No. 15/647,339, filed Jul. 12, 2017, Ser. No. 15/619,627, filed Jun. 12, 2017, Ser. No. 15/584,265, filed May 2, 2017, Ser. No. 15/467,247, filed Mar. 23, 2017, Ser. No. 15/446,220, filed Mar. 1, 2017, and/or Ser. No. 15/675,919, filed Aug. 14, 2017, and/or International PCT Application No. PCT/IB2017/054120, filed Jul. 7, 2017, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A sensing system of a vehicle, said sensing system comprising:
   a sensor module disposed at a vehicle equipped with said sensing system;
   wherein said sensor module comprises a sensor package that houses in a common housing (i) a first radar sensor disposed in the common housing and having a plurality of transmitting antennas and a plurality of receiving antennas disposed at a first substrate, (ii) a second radar sensor disposed in the common housing and having a plurality of transmitting antennas and a plurality of receiving antennas disposed at a second substrate, and (iii) a camera disposed in the common housing between said first radar sensor and said second radar sensor;
   wherein the transmitting and receiving antennas of said first radar sensor are oriented in a first orientation at the first substrate;
   wherein the transmitting and receiving antennas of said second radar sensor are oriented in a second orientation at the second substrate;
   wherein the first orientation is different than the second orientation by rotation of said first radar sensor relative to said second radar sensor about a first axis perpendicular to the first substrate;
   wherein said first radar sensor is rotated clockwise relative to said camera about the first axis, and wherein said second radar sensor is rotated counter-clockwise relative to said camera about a second axis perpendicular to the second substrate;
   wherein said first radar sensor has a first field of sensing exterior the equipped vehicle, and wherein said second radar sensor has a second field of sensing exterior the equipped vehicle, and wherein said camera has a field of view exterior the equipped vehicle;
   wherein the first field of sensing of said first radar sensor is encompassed by a portion of the field of view of said camera, and wherein the second field of sensing of said second radar sensor is encompassed by another portion of the field of view of said camera;
   a control, wherein outputs of said first and second radar sensors and said camera are communicated to said control;
   wherein said control comprises a processor that processes the outputs;
   wherein said control, responsive to processing of the outputs of said first and second radar sensors, detects the presence of an object exterior the vehicle and within the field of sensing of at least one of said first radar sensor and said second radar sensor; and
   wherein said control, responsive to detection of the presence of an object via processing of the outputs of said first and second radar sensors, processes the output of said camera to classify the detected object.

2. The sensing system of claim 1, wherein physical orientation of said second radar sensor relative to said camera is different from physical orientation of said first radar sensor relative to said camera.

3. The sensing system of claim 1, wherein said first and second radar sensors are positioned such that their horizontal and vertical azimuths are intersecting.

4. The sensing system of claim 1, wherein said sensor module comprises a circuit board and wherein said first and second radar sensors and said camera are disposed at said circuit board, and wherein said camera is disposed at said circuit board at a location between said first and second radar sensors.

5. The sensing system of claim 1, wherein said sensor module is disposed at a rear of the vehicle such that said camera views rearward of the vehicle.

6. The sensing system of claim 5, wherein, during a reversing maneuver of the vehicle, a display device of the vehicle displays video images derived from the output of said camera.

7. The sensing system of claim 1, wherein a display device of the vehicle is operable to display video images derived from the output of said camera.

8. The sensing system of claim 1, wherein each of said first and second radar sensors comprises an array of virtual antennas.

9. The sensing system of claim 8, wherein said array of virtual antennas comprises at least four virtual antennas.

10. The sensing system of claim 1, wherein said sensor module is part of a sensing system capable of providing driver assist system functions.

11. The sensing system of claim 10, wherein said sensing system provides detection for at least one of automated parking, blind spot detection, cross traffic alert, lane change and merge aid, automatic emergency braking, pedestrian detection, turn assist, terrain mapping and intersection collision mitigation.

12. The sensing system of claim 1, wherein radar signals transmitted by said plurality of transmitting antennas of said first radar sensor are received by said plurality of receiving antennas of said second radar sensor, and wherein radar signals transmitted by said plurality of transmitting antennas of said second radar sensor are received by said plurality of receiving antennas of said first radar sensor.

13. The sensing system of claim 1, wherein said first radar sensor, said second radar sensor and said camera are disposed on a circuit board, and wherein said circuit board is disposed along the first and second substrates.

14. The sensing system of claim 1, wherein said first radar sensor is rotated 90 degrees about the first axis relative said second radar sensor.

15. A sensing system of a vehicle, said sensing system comprising:
  a sensor module disposed at a vehicle equipped with said sensing system;
  wherein said sensor module comprises a sensor package that houses in a common housing (i) a first radar sensor disposed in the common housing and having a plurality of transmitting antennas and a plurality of receiving antennas disposed at a first substrate, (ii) a second radar sensor disposed in the common housing and having a plurality of transmitting antennas and a plurality of receiving antennas disposed at a second substrate, and (iii) a camera disposed in the common housing between said first radar sensor and said second radar sensor;
  wherein the transmitting and receiving antennas of said first radar sensor are oriented in a first orientation at the first substrate;
  wherein the transmitting and receiving antennas of said second radar sensor are oriented in a second orientation at the second substrate;
  wherein the first orientation is different than the second orientation by rotation of said first radar sensor relative to said second radar sensor about a first axis perpendicular to the first substrate;
  wherein said first radar sensor is rotated by a selected angle relative to said camera about the first axis in a clockwise direction when viewing the first substrate, and wherein said second radar sensor is rotated by the selected angle relative to said camera about a second axis perpendicular to the second substrate in a counter-clockwise direction when viewing the second substrate;
  wherein said first radar sensor has a first field of sensing exterior the equipped vehicle, and wherein said second radar sensor has a second field of sensing exterior the equipped vehicle, and wherein said camera has a field of view exterior the equipped vehicle;
  wherein the first field of sensing of said first radar sensor is encompassed by a portion of the field of view of said camera, and wherein the second field of sensing of said second radar sensor is encompassed by another portion of the field of view of said camera;
  a control, wherein outputs of said first and second radar sensors and said camera are communicated to said control;
  wherein said control comprises a processor that processes the outputs;
  wherein said control, responsive to processing of the outputs of said first and second radar sensors, detects the presence of an object exterior the vehicle and within the field of sensing of at least one of said first radar sensor and said second radar sensor; and
  wherein said control, responsive to detection of the presence of an object via processing of the outputs of said first and second radar sensors, processes the output of said camera to classify the detected object.

16. The sensing system of claim 15, wherein the first axis is parallel to the second axis.

17. The sensing system of claim 16, wherein the selected angle is less than or equal to 45 degrees.

18. The sensing system of claim 16, wherein the selected angle is 35 degrees.

* * * * *